US007646963B2

(12) United States Patent
Kato et al.

(10) Patent No.: US 7,646,963 B2
(45) Date of Patent: Jan. 12, 2010

(54) INFORMATION PROCESSING APPARATUS, INFORMATION PROCESSING METHOD AND PRESENTATION MEDIUM

(75) Inventors: Motoki Kato, Kanagawa (JP); Yasushi Fujinami, Tokyo (JP)

(73) Assignee: Sony Corporation, Tokyo (JP)

( * ) Notice: Subject to any disclaimer, the term of this patent is extended or adjusted under 35 U.S.C. 154(b) by 839 days.

(21) Appl. No.: 10/627,545

(22) Filed: Jul. 25, 2003

(65) Prior Publication Data

US 2004/0018002 A1 Jan. 29, 2004

Related U.S. Application Data

(63) Continuation of application No. 09/313,411, filed on May 18, 1999, now Pat. No. 6,618,549.

(30) Foreign Application Priority Data

May 20, 1998 (JP) ............................. 10-138035
Apr. 26, 1999 (JP) ............................. 11-117534

(51) Int. Cl.
*H04N 5/91* (2006.01)
(52) U.S. Cl. ............................. 386/94; 360/60; 380/209
(58) Field of Classification Search .................. 386/96, 386/94; 360/60; 380/201
See application file for complete search history.

(56) References Cited

U.S. PATENT DOCUMENTS 5,948,136 A    9/1999  Smyers

| | | | |
|---|---|---|---|
| 5,987,126 A * | 11/1999 | Okuyama et al. | ........... 380/203 |
| 6,256,390 B1 | 7/2001 | Okuyama et al. | |
| 6,298,196 B1 * | 10/2001 | Shima et al. | ................... 386/94 |
| 6,298,406 B1 | 10/2001 | Smyers | |
| 7,177,427 B1 * | 2/2007 | Komuro et al. | .............. 380/239 |
| 7,218,736 B1 * | 5/2007 | Nishimura et al. | .......... 380/201 |

FOREIGN PATENT DOCUMENTS

| JP | 08-124309 | 5/1996 |
|---|---|---|
| JP | 08-125971 | 5/1996 |
| JP | 08-203213 | 8/1996 |
| JP | 09-098381 | 4/1997 |
| JP | 09-214882 | 8/1997 |

(Continued)

OTHER PUBLICATIONS

Patent Abstracts of Japan, JP 11-086437, Mar. 30, 1999 (reference previously filed in Japanese language on Jul. 25, 2003).

*Primary Examiner*—Thai Tran
*Assistant Examiner*—Girumsew Wendmagegn
(74) *Attorney, Agent, or Firm*—Oblon, Spivak, McClelland, Maier & Neustadt, L.L.P.

(57) ABSTRACT

An information processing apparatus comprises an extracting means for extracting main information including first copy control information and auxiliary information representing attributes of the main information from input information; a first generating means for generating second copy control information based on the auxiliary information extracted by the extracting means; and an adding means for adding the second copy control information generated by the first generating means to the main information extracted by the extracting means. As a result, even an apparatus not capable of analyzing first copy control information is capable of executing copy control.

44 Claims, 7 Drawing Sheets

FOREIGN PATENT DOCUMENTS

| | | |
|---|---|---|
| JP | 09-320193 | 12/1997 |
| JP | 10-124998 | 5/1998 |
| JP | 10-302391 | 11/1998 |
| JP | 11-086437 | 3/1999 |
| WO | WO 98 02881 | 1/1998 |
| WO | WO 99 22372 | 5/1999 |

* cited by examiner

FIG. 2 copy_permission_indicator table

| VALUE | DESCRIPTION |
|---|---|
| 00 | copy free |
| 01 | reserved |
| 02 | copy once |
| 11 | copy prohibited |

FIG. 3

SID : source node ID
DBS : data block size in quadlets
FN  : fraction number
QPC : quadlets padding count
SPH : source packet header flag Res : reserved
DBC : data block continuity counter
FMT : format ID
FDF : format dependent field

FIG. 4 source packet

FIG.5A

```
VDR_MPEG2_transport_stream
---------------------------------------------------------------
Syntax                                          No. of bits   Mnemonic
---------------------------------------------------------------
VDR_MPEG2_transport_stream () {
    do {
        transport_packet ()                      188*8         bslbf
        if ( TSP_extra_information_flag == 1 )
            TSP_extra_information ()             32            bslbf
    } while ( nextbits () == sync_byte )
}
```

FIG.5B

```
VDR_MPEG2_transport_stream () {
    while ( End_of_File ) {
        if ( TSP_extra_information_flag == 1 )
            TSP_extra_information ()
        transport_packet ()
    }
}
```

FIG.6

```
TSP_extra_information
---------------------------------------------------------------
Syntax                                          No. of bits   Mnemonic
---------------------------------------------------------------
TSP_extra_information ()
{                                                24            uimsbf
    time_stamp_counter                           1             uimsbf
    tsc_discontinuity_indicator                  2             uimsbf
    copy_permission_indicator                    1             uimsbf
    CCI_invalid_flag                             4             bslbf
    reserved
}
```

| VDR _ MPEG2 _ program _ stream | | |
|---|---|---|
| Syntax | No. of bits | Mnemonic |

```
VDR _ MPEG2 _ program _ stream () {
      do {
            MPEG2 _ pack ()
            if ( PSP _ extra _ information _ flag == 1 )
                  PSP _ extra _ information ()              8        bslbf
      } while ( nextbits () == pack _ start _ code )
      if ( nextbits () == '000 0000 0000 0000 0000 0000' )
            MPEG _ program _ end _ code.                    32       bslbf
}
```

FIG. 9

| PSP _ extra _ information | | |
|---|---|---|
| Syntax | No. of bits | Mnemonic |

```
PSP _ extra _ information ()
{
      copy _ permission _ indicator           2        uimsbf
      CCI _ invalid _ flag                    1        uimsbf
      reserved                                29       bslbf
}
```

FIG. 10

| VDR_SD_DVCR_stream | | |
|---|---|---|
| Syntax | No. of bits | Mnemonic |
| VDR_SD_DVCR_stream ( ) {<br>    for(i=0;i<number_of_SD_DVCR_frame;i++) {<br>        if (SD_DVCR_extra_information_flag==1)<br>            SD_DVCR_frame_extra_information( )<br>        SD_DVCR_frame( )<br>    }<br>} | <br><br><br>8*4<br> | <br><br><br>bslbf<br> |

FIG. 11

| SD_DVCR_frame_extra_information ( ) | | |
|---|---|---|
| Syntax | No. of bits | Mnemonic |
| SD_DVCR_frame_extra_information ( )<br>{<br>    copy_permission_indicator<br>    CCI_invalid_flag<br>    reserved<br>} | <br><br>2<br>1<br>29 | <br><br>uimsbf<br>uimsbf<br>bslbf |

FIG. 14

```
TSP_extra_header ( ) {
    reserved                    3 bits
    time_stamp_counter          21 bits
}
```

RECORDING FORMAT OF THE Transport Packet

INFORMATION PROCESSING APPARATUS, INFORMATION PROCESSING METHOD AND PRESENTATION MEDIUM

CROSS REFERENCE TO RELATED APPLICATIONS

This is a continuation of U.S. patent application Ser. No. 09/313,411 filed May 18, 1999, now U.S. Pat. No. 6,618,549.

BACKGROUND OF THE INVENTION

1. Field of the Invention

The present invention relates to an information processing apparatus, an information processing method adopted in the apparatus and a presentation medium for presenting the method. More particularly, the present invention relates to an information processing method capable of implementing copy control with a high degree of reliability, an information processing apparatus adopting the method and a presentation medium for presenting the method.

2. Description of the Related Art

Figure 12:
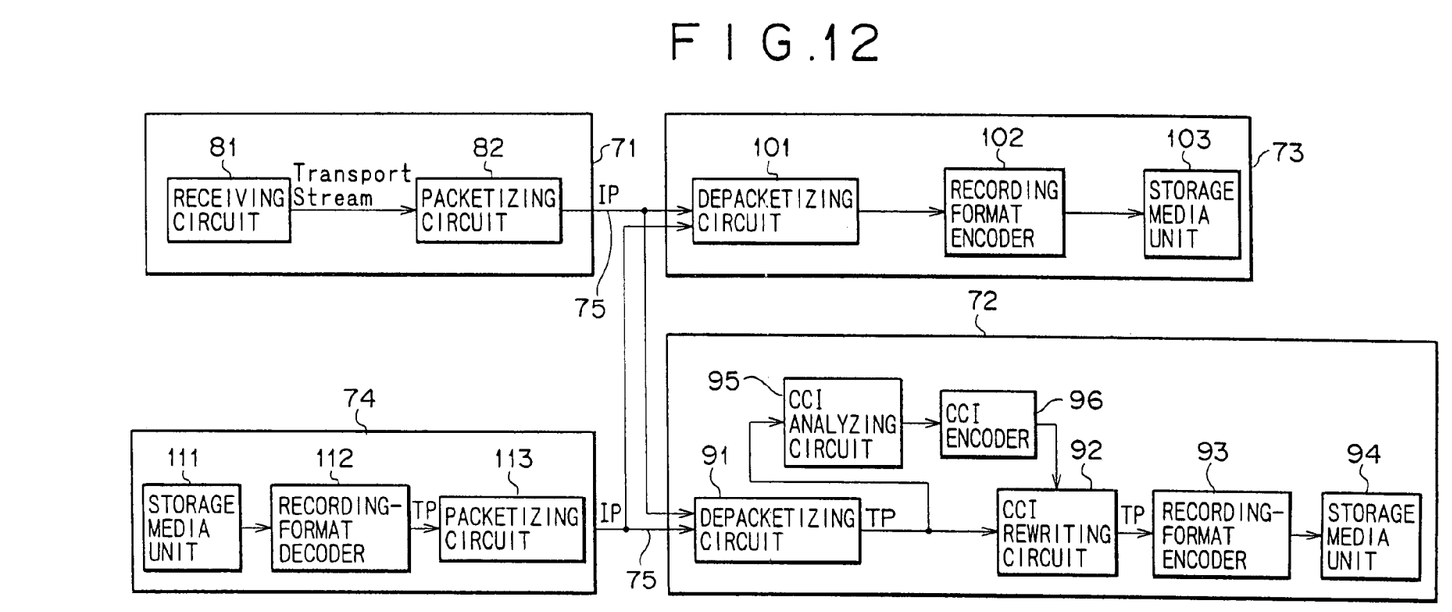
FIG. 12 is a block diagram showing a typical configuration of the conventional network system.

FIG. 12 is a diagram showing a typical configuration of an information recording and playback system. As shown in the figure, an IRD (Integrated Recorder/Decoder) 71, digital-signal recording apparatuses 72 and 73 and a digital-signal playback apparatus 74 are connected to each other by IEEE1394 serial buses 75.

In the IRD 71, a receiving circuit 81 receives a satellite broadcast, supplying a transport stream of the received broadcast to a packetizing circuit 82. The packetizing circuit 82 converts the transport stream supplied thereto into isochronous packets (IPs) conforming to IEEE1394 digital interface standards. The IPs are supplied to the digital-signal recording apparatuses 72 and 73.

The digital-signal playback apparatus 74 plays back data recorded on a storage-media unit 111 which corresponds to storage-media units 94 and 103 employed in the digital-signal recording apparatuses 72 and 73 respectively. The reproduced data is then decoded by a recording-format decoder 112. Subsequently, a transport stream output by the recording-format decoder 112 is converted by a packetizing circuit 113 into packets which are then supplied to the digital-signal recording apparatuses 72 and 73 by way of the IEEE1394 serial buses 75.

The digital-signal recording apparatus 72 has a depacketizing circuit 91 for depacketizing data of the isochronous packets supplied thereto through the IEEE1394 serial bus 75 in order to restore the transport stream which is supplied to a recording-format encoder 93 by way of a CCI (Copy Control Information) rewriting circuit 92. The depacketizing circuit 91 also supplies the transport stream to a CCI analyzing circuit 95. The CCI analyzing circuit 95 extracts copy control information (CCI) from the transport stream, analyzes the information and supplies a result of the analysis to a CCI encoder 96.

The CCI encoder 96 encodes (or changes) CCI supplied thereto into new CCI and outputs the new CCI to the CCI rewriting circuit 92. The CCI rewriting circuit 92 rewrites CCI included in the transport stream received from the depacketizing circuit 91 with the new CCI received from the CCI encoder 96, outputting the transport stream to the recording-format encoder 93. The recording-format encoder 93 encodes the transport stream supplied thereto and records the encoded transport stream into the storage media unit 94.

A depacketizing circuit 101 and a recording-format encoder 102 employed in the digital-signal recording apparatus 73 carry out the same processing as the depacketizing circuit 91 and the recording-format encoder 93 respectively employed in the digital-signal recording apparatus 72 on data received from the IEEE1394 serial bus 75, recording a result of the processing into the storage media unit 103. The digital-signal recording apparatus 73 does not have the CCI analyzing circuit 95, the CCI encoder 96 and the CCI rewriting circuit 92 employed in the digital-signal recording apparatus 72. That is to say, the digital-signal recording apparatus 73 functions as a non-cognizant apparatus which is not capable of analyzing CCI recorded in a stream. On the other hand, the digital-signal recording apparatus 72 functions as a cognizant apparatus which is capable of analyzing CCI recorded in a stream.

Next, the operation of the information recording and playback system is explained. An operation to record data received by the IRD 71 is carried out by the digital-signal recording apparatus 73 as follows. When a signal of a predetermined channel is received by the receiving circuit 81 employed in the IRD 71, the transport stream of the signal is supplied to the packetizing circuit 82. The packetizing circuit 82 converts the transport stream supplied thereto into isochronous packets which are supplied to the digital-signal recording apparatus 73 through the IEEE1394 serial bus 75.

In the digital-signal recording apparatus 73, the depacketizing circuit 101 depacketizes the isochronous packets supplied thereto, outputting the transport stream to the recording-format encoder 102. The recording-format encoder 102 encodes the transport stream supplied thereto by adopting a predetermined encoding technique, recording the encoded data into the storage media unit 103.

Data output by the IRD 71 can also be recorded into the digital-signal recording apparatus 72. In this case, the depacketizing circuit 91 depacketizes the isochronous packets supplied thereto through the IEEE1394 serial bus 75, supplying the transport stream to the CCI rewriting circuit 92 and the CCI analyzing circuit 95. The CCI analyzing circuit 95 extracts CCI from the transport stream, analyzes the CCI and supplies a result of the analysis to the CCI encoder 96. In the CCI encoder 96, if the CCI is "copy once", the CCI is converted into "copy prohibited". If the CCI is "copy free", the CCI is not changed. If the CCI is "copy prohibited", the CCI encoder 96 controls the CCI rewriting circuit 92 to prohibit a recording operation.

The CCI rewriting circuit 92 receives CCI obtained as a result of encoding from the CCI encoder 96. If the CCI received from the CCI encoder 96 is "copy free" or "copy prohibited", the CCI rewriting circuit 92 rewrites the CCI included in the transport stream received from the depacketizing circuit 91 with the CCI received from the CCI encoder 96, outputting the rewritten transport stream to the recording-format encoder 93. The recording-format encoder 93 encodes the transport stream supplied thereto, recording the encoded data into the storage media unit 94.

As described above, data output by the IRD 71 is recorded. It should be noted that data played back by the digital-signal playback apparatus 74 can also be recorded. In this case, the digital-signal playback apparatus 74 plays back data recorded on the storage-media unit 111. The reproduced data is then decoded by the recording-format decoder 112. Subsequently, a transport stream output by the recording-format decoder 112 is converted by the packetizing circuit 113 into isochronous packets which are then supplied to the digital-signal recording apparatuses 72 and 73 by way the IEEE1394 serial buses 75. Then, a recording operation is carried out in the same way as what is described above.

Figure 13:
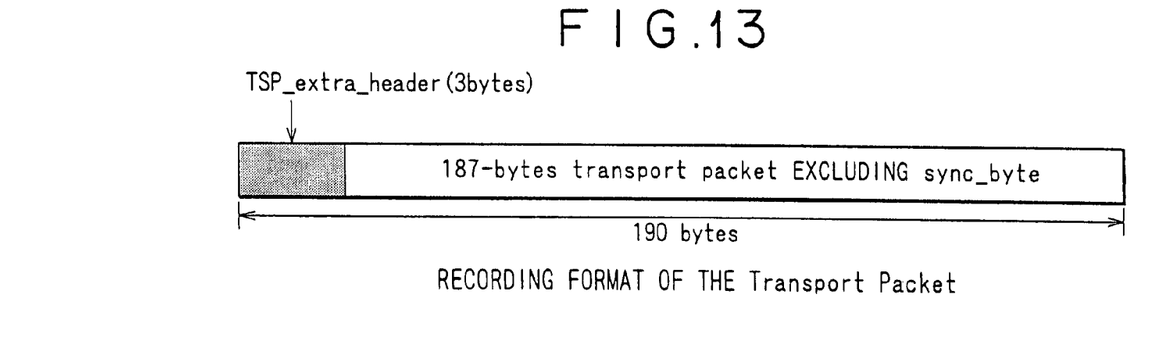
FIG. 13 is an explanatory diagram showing the format of a transport packet.
Figure 14:
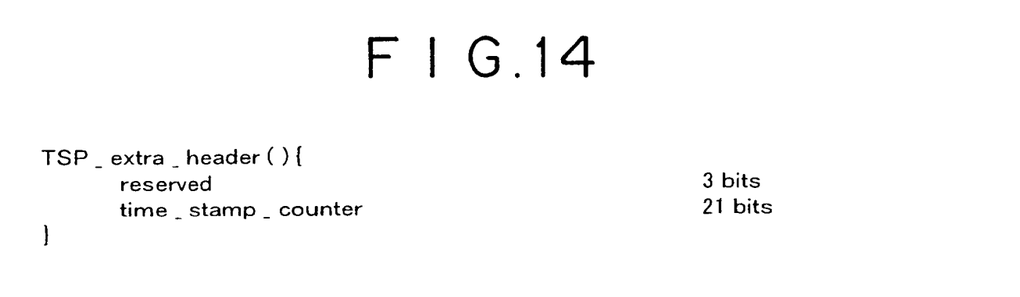
FIG. 14 is an explanatory diagram showing TSP_extra_header.

A transport stream output by the receiving circuit 81 conforms to the MPEG2 systems (ISO/IEC13818-1). In the transport stream, video and audio streams are multiplexed in transport-packet units each having a length of 188 bytes. Assume that the digital-signal recording apparatus 72 is a DVCR (Digital Video Cassette Recorder) for consumer use. In this case, the depacketizing circuit 91 outputs data obtained as a result of addition of 3-byte TSP_extra_header to the head of 187 bytes as shown in FIG. 13. The 187 bytes are the bytes of a transport packet of the transport stream conforming to the MPEG2 systems excluding a byte of the sync_byte at the head of the transport packet. The syntax of TSP_extra_header has a configuration shown in FIG. 14. As shown in the figure, TSP_extra_header includes 21-bit time_stamp_counter which represents a planned arrival time of the first bit of the first byte of a transport packet at an input of a T-STD (Transport Stream System Target Decoder) or a smoothing buffer defined in the ISO/IEC 13818-1 (MPEG2 systems).

In the DVCR, a clock having a frequency of 27 MHz is locked in a PCR (Program_Clock_Reference) included in the transport stream and a clock counter of an arrival of the first byte of a transport packet at the smoothing buffer or the T-STD is added as time_stamp_counter of the transport packet. In a playback operation, a transport packet is output when the clock-counter value of the clock with a frequency of 27 MHz of the DVCR becomes equal to the value of time_stamp_counter of the transport packet.

In the system described above, copy control based on CCI in a cognizant apparatus capable of analyzing CCI can be executed correctly. Since a non-cognizant apparatus is not capable of analyzing CCI, however, there is raised a problem that data is recorded into storage media even if CCI of the data indicates "copy prohibited". In the case of "copy once" CCI, a copy operation should be allowed only once. It is thus necessary to rewrite the CCI from "copy once" into "copy prohibited" after a copy operation has been carried out once. Since such rewriting is not carried out in a non-cognizant apparatus, however, copy operations may be carried out any number of times.

SUMMARY OF THE INVENTION

It is thus an object of the present invention addressing the problem described above to execute copy control correctly.

An information processing apparatus according to claim 1 comprises an extracting means for extracting main information including first copy control information and auxiliary information representing attributes of the main information from input information; a first generating means for generating second copy control information based on the auxiliary information extracted by the extracting means; and an adding means for adding the second copy control information generated by the first generating means to the main information extracted by the extracting means.

An information processing method according to claim 8 comprises an extracting step of extracting main information including first copy control information and auxiliary information representing attributes of the main information from input information; a generating step of generating second copy control information based on the auxiliary information extracted at the extracting step; and an adding step of adding the second copy control information generated at the generating step of generating second copy information to the main information extracted at the extracting step.

A presentation medium according to claim 9 is used for presenting a program to be executed to drive an information processing apparatus to carry out processing including an extracting step of extracting main information including first copy control information and auxiliary information representing attributes of the main information from input information; a generating step of generating second copy control information based on the auxiliary information extracted at the extracting step; and an adding step of adding the second copy control information generated at the generating step of generating second copy control information to the main information extracted at the extracting step.

An information processing apparatus according to claim 10 comprises an extracting means for extracting main information including first copy control information and extracting second copy control information added to the main information from input information; a third generating means for generating rewrite information used for rewriting the first copy control information included in the main information in accordance with the second copy control information extracted by the extracting means; and a rewriting means for rewriting the first copy control information included in the main information with the rewrite information generated by the third generating means.

An information processing method according to claim 13 comprises: an extracting step of extracting main information including first copy control information and extracting second copy control information added to the main information from input information; a generating step of generating rewrite information used for rewriting the first copy control information included in the main information in accordance with the second copy control information extracted at the extracting step; and a rewriting step of rewriting the first copy control information included in the main information with the rewrite information generated at the generating step of generating rewrite information.

A presentation medium according to claim 14 is used for presenting a program to be executed to drive an information processing apparatus for outputting information to carry out processing including an extracting step of extracting main information including first copy control information and extracting second copy control information added to the main information from input information; a generating step of generating rewrite information used for rewriting the first copy control information included in the main information in accordance with the second copy control information extracted at the extracting step; and a rewriting step of rewriting the first copy control information included in the main information with the rewrite information generated at the generating step of generating rewrite information.

According to an information processing apparatus as in claim 1, an information processing method as in claim 8 and a presentation medium as in claim 9, second copy control information generated in accordance with extracted auxiliary information is added to main information.

According to an information processing apparatus as in claim 10, an information processing method as in claim 13 and a presentation medium as in claim 14, first copy control information included in main information is rewritten in accordance with second copy control information extracted from input information;

DESCRIPTION OF THE PREFERRED EMBODIMENTS

Figure 1:
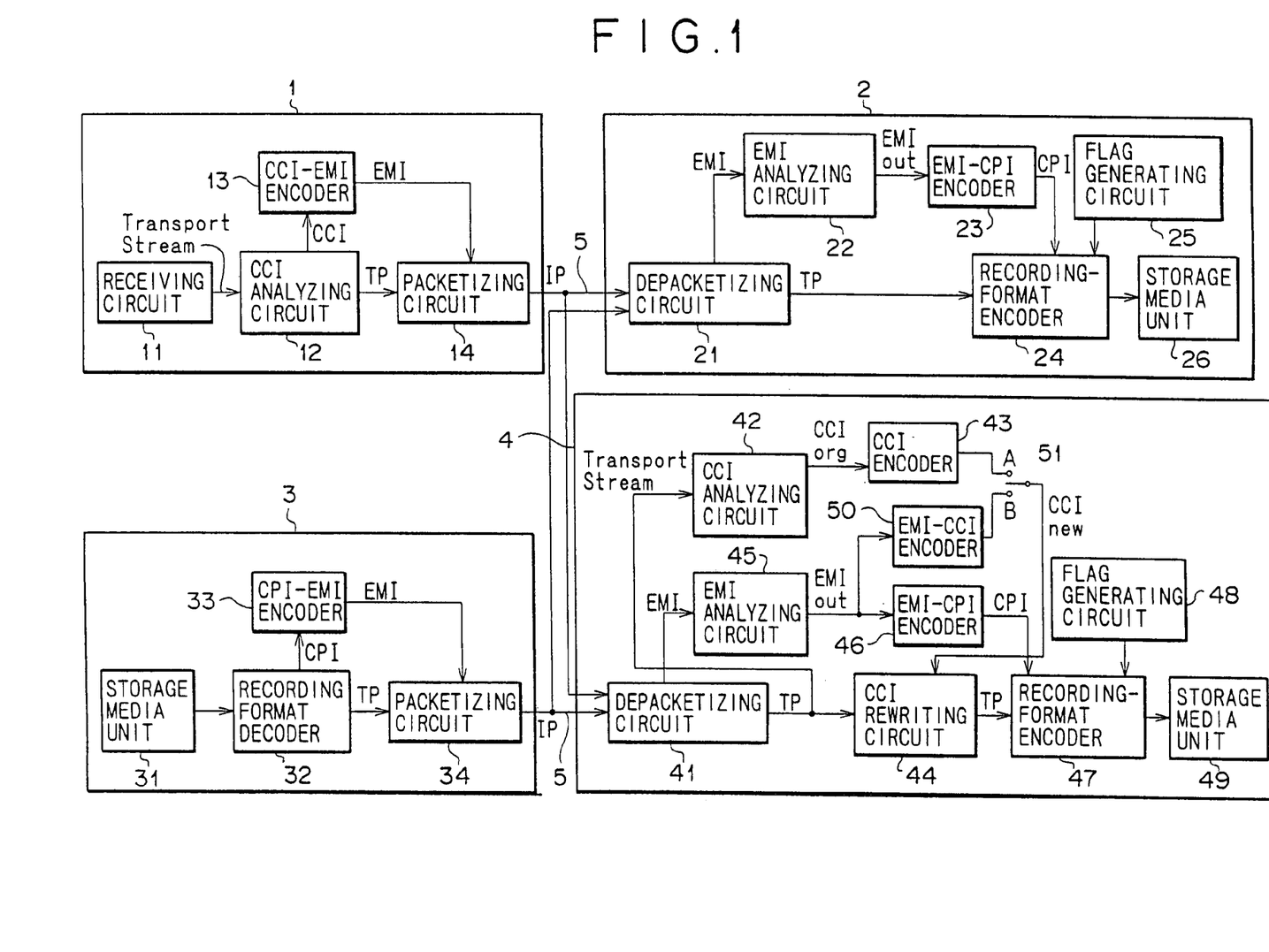
FIG. 1 is a block diagram showing a typical configuration of a network system in which information processing apparatuses provided by the present invention are used.

FIG. 1 is a block diagram showing a typical configuration of a network system to which the present invention is applied. In this typical configuration, an IRD 1, a non-cognizant recorder 2, a digital-signal playback apparatus 3 and a cognizant recorder 4 are connected to each other by IEEE1394 serial buses 5. In actuality, the apparatuses are connected to a IEEE1394 serial bus 5 in series to form a cascade. To make the explanation simple, however, the figure shows a configuration wherein the outputs of the IRD 1 and the digital-signal playback apparatus 3 are supplied to the non-cognizant recorder 2 and the cognizant recorder 4.

In the IRD 1, a receiving circuit 11 receives a broadcast wave from a satellite not shown in the figure, supplying a transport stream of a predetermined channel to a CCI analyzing circuit 12. The transport stream conforms to the MPEG2 systems (ISO/IEC13818-1). In the transport stream, video and audio streams are multiplexed in transport-packet units each having a length of 188 bytes.

The CCI analyzing circuit 12 extracts copy control information (CCI) from the transport stream supplied thereto and supplies the CCI to a CCI-EMI encoder 13. A location in the transport stream at which CCI is recorded varies from application to application. Typically, CCI is stored in copyright_extension of a video layer or PES_scrambling_control of PES_packet. There are 3 types of CCI such as, "copy prohibited", "copy once" and "copy free".

The CCI-EMI encoder 13 generates an EMI (Encryption_Mode Indicator) based on the CCI received from the CCI analyzing circuit 12, supplying the EMI to a packetizing circuit 14. The EMI and the CCI are subjected to standardization set by a DTDG (Data Transmission Discussion Group). There are 3 EMI types, namely, mode A (proh), mode B (once) and free. Mode A is a mode for "copy prohibited" data and mode B is a mode for "copy once" data. The free type is a mode for content data with the "copy free" CCI uncoded. The packetizing circuit 14 converts transport packets of the transport stream received from the CCI analyzing circuit 12 into isochronous packets of the IEEE1394 serial bus 5, outputting the isochronous packets to the bus 5. At that time, the packetizing circuit 14 encodes the transport packets by using the EMI as a base.

In the digital-signal playback apparatus 3, data recorded on a storage media unit 31 is played back and decoded by a recording-format decoder 32. The storage media unit 31 corresponds to a storage media unit 26 for recording data in the non-cognizant recorder 2 or a storage media unit 49 for recording data in the cognizant recorder 4. The recording-format decoder 32 extracts CPI (Copy_Permission_Indicator) from a stream received from the storage media unit 31 and outputs the CPI to a CPI-EMI encoder 33. At the same time, the recording-format decoder 32 decodes data supplied thereto and supplies transport packets of the data to a packetizing circuit 34.

Figure 2:
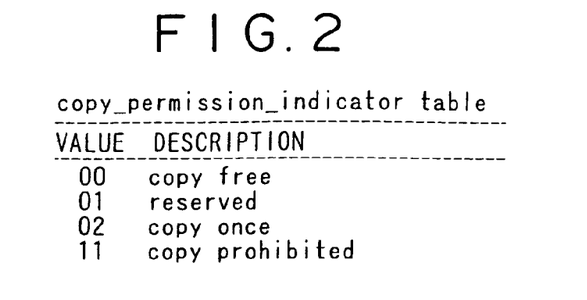
FIG. 2 is an explanatory diagram showing copy_permission_indicator.

Details of the CPI will be described later. A CPI is added to a transport packet by a recording-format encoder 24 employed in the non-cognizant recorder 2 or a recording-format encoder 47 employed in the cognizant recorder 4. As shown in FIG. 2, the CPI is represented by 2 bits. A CPI value of 00 represents "copy free" and a CPI value of 10 represents "copy once". A CPI value of 11 represents "copy prohibited".

The CPI-EMI encoder 33 generates an EMI based on a CPI supplied thereto, outputting the EMI to the packetizing circuit 34. The packetizing circuit 34 encodes a transport packet received from the recording-format decoder 32 by using the EMI received from the CPI-EMI encoder 33 as a base. At the same time, the CPI-EMI encoder 33 converts the transport packet into an isochronous packet and adds the EMI to the isochronous packet.

Figure 3:
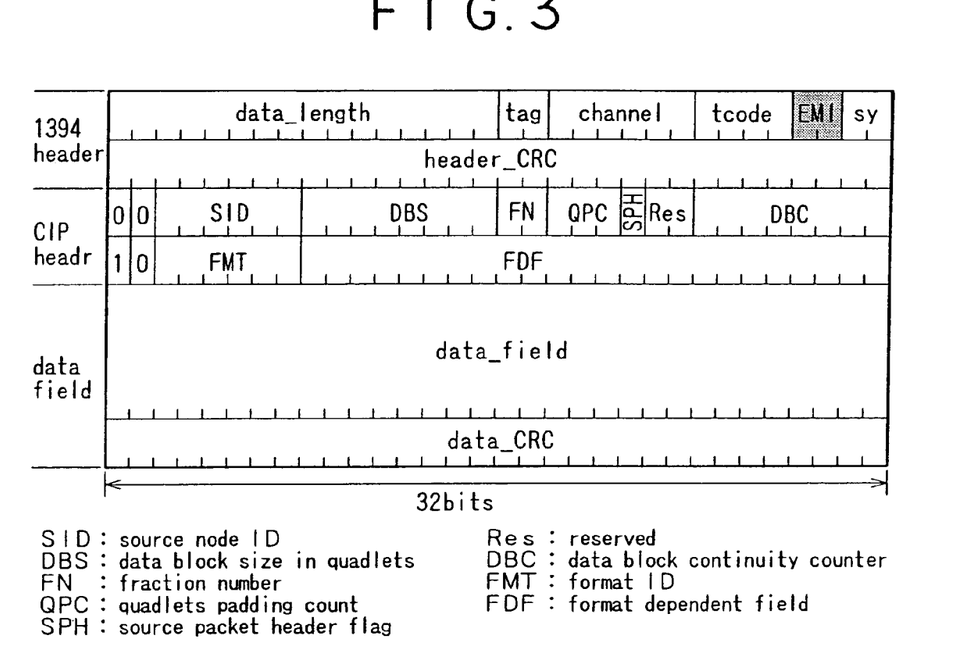
FIG. 3 is an explanatory diagram showing an isochronous packet.
Figure 4:
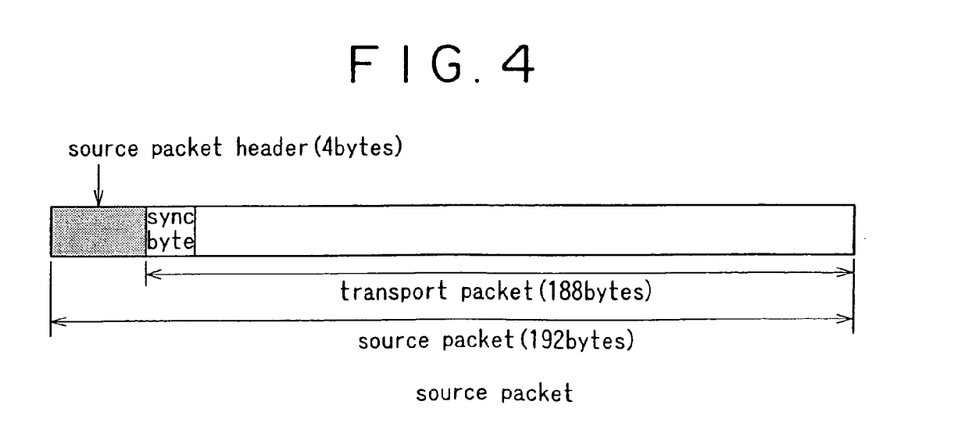
FIG. 4 is an explanatory diagram showing a source packet.

A packet generated by the packetizing circuit 14 employed in the IRD 1 or the packetizing circuit 34 employed in the digital-signal playback apparatus 3 has a configuration like one shown in FIG. 3. As shown in the figure, 8 bytes at the head of the packet are a 1394 header and the following 8 bytes are a CIP (Common Isochronous Packet) header which is followed by a data field. The 1394 header includes the EMI described above in addition to information such as a data length (data_length) and a channel number (channel). On the other hand, the CIP header includes a source-node ID (SID) representing the originator of the data in addition to information such as a DBS (Data Block Size) expressed in terms of quadlets and an FN. The DBS is a field for recording the size of a data block which represents a packetizing unit and the FN is a field for recording the number of fragments resulting from the packetizing. The CIP header also includes a DBC (data block continuity counter).

data_field of the data field is used for recording data of the transport stream. A source packet header of 4 bytes is added to a 188-byte transport packet of a transport stream output by the CCI analyzing circuit 12 to form a source packet of 192 bytes as shown in FIG. 4. A source packet is divided into 8 data blocks each comprising 24 bytes. The data recorded in data_field is composed of N data blocks. The number of data blocks (N) included in an isochronous packet can be 0, 1, 2 or 4, or a multiple of 8. The value of N is recorded in the DBC field of the CIP header.

In the non-cognizant recorder 2, a depacketizing circuit 21 depacketizes isochronous packets received from the IRD 1 or the digital-signal playback apparatus 3 through the IEEE1394 serial bus 5 and extracts an EMI included in the 1394 header, supplying the EMI to an EMI analyzing circuit 22. In addition, the depacketizing circuit 21 also extracts a transport packet of the transport stream recorded in data_field of the isochronous packet, decodes the transport packet by using the EMI and supplies the decoded packet to the recording-format encoder 24.

The EMI analyzing circuit 22 analyzes the EMI supplied thereto, supplying a result of the analysis to an EMI-CPI encoder 23. The EMI-CPI encoder 23 generates a CPI for the EMI supplied thereto, outputting the CPI to the recording-format encoder 24. That is to say, this EMI-CPI encoder 23 carries out a reversed process of the CPI-EMI encoder 33 employed in the digital-signal playback apparatus 3.

A flag generating circuit 25 generates a value of 1 as CCI_invalid_flag output to the recording-format encoder 24. The recording-format encoder 24 encodes a transport packet supplied thereto by the depacketizing circuit 21 and adds the CPI received from the EMI-CPI encoder 23 and CCI_invalid_flag received from the flag generating circuit 25 to the encoded packet to generate data with a syntax of VDR_MPEG2_transport_stream shown in FIGS. 5A and 5B. The data is supplied to the storage media unit 26 to be stored therein.

Figure 5A:
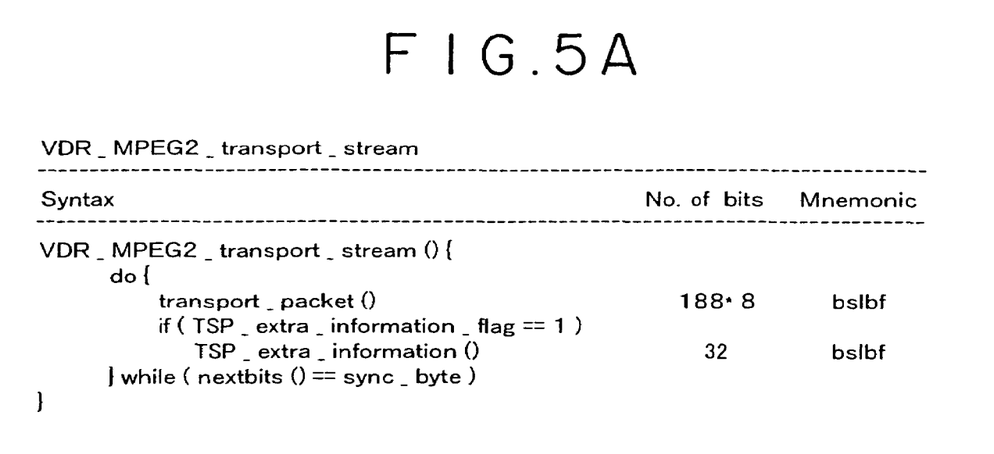
FIGS. 5A and 5B are explanatory diagrams showing VDR_MPEG2_transport_stream.

As shown in FIG. 5A, VDR_MPEG2_transport_stream output by the recording-format encoder 24 comprises transport_packet ( ) and TSP_extra_information ( ) added after transport_packet ( ) transport_packet ( ) is used for recording a transport packet output by the depacketizing circuit 21.

Figure 5B:
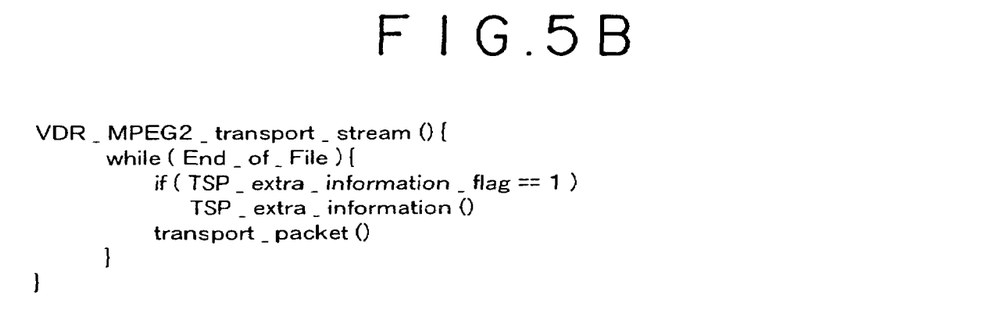
Figure 6:
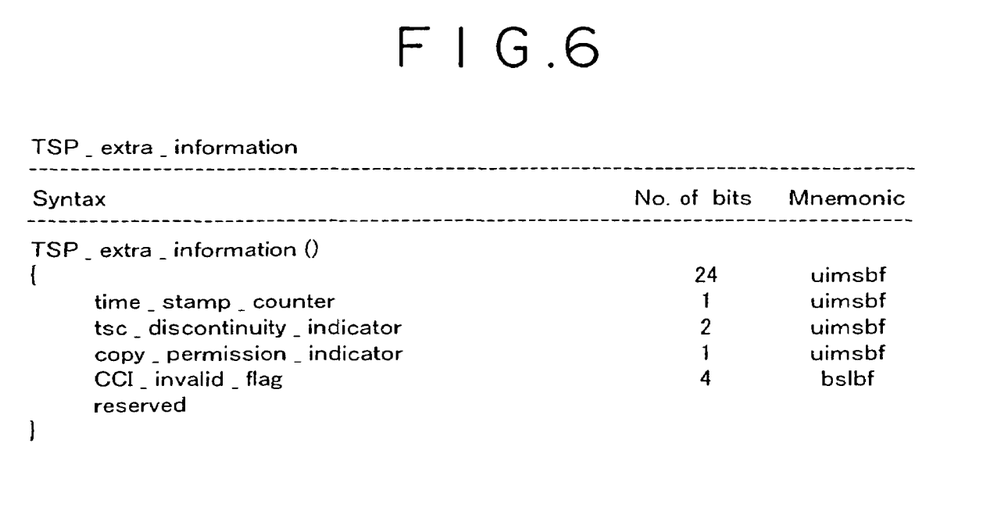
FIG. 6 is an explanatory diagram showing TSP_extra_information.

The syntax of TSP_extra_information ( ) is shown in FIG. 6. As shown in the figure, TSP_extra_information ( ) includes a CPI (copy_permission_indicator) output by the EMI-CPI encoder 23 and CCI_invalid_flag output by the flag generating circuit 25. TSP_extra_information ( ) can also be added in front of the transport packet as shown in FIG. 5B.

In the cognizant recorder 4, a depacketizing circuit 41 depacketizes isochronous packets supplied thereto through the IEEE1394 serial bus 5, extracting an EMI included in the 1394 header to be supplied to an EMI analyzing circuit 45. In addition, the depacketizing circuit 41 decodes a transport packet included in the data field of the isochronous packet, outputting a result of decoding to a CCI analyzing circuit 42 and a CCI rewriting circuit 44.

The EMI analyzing circuit 45 analyzes the EMI supplied thereto, supplying a result of the analysis to an EMI-CPI encoder 46 and an EMI-CCI encoder 50. The EMI-CPI encoder 46 generates a CPI for the EMI supplied thereto, outputting the CPI to a recording-format encoder 47. That is to say, this EMI analyzing circuit 45 and this EMI-CPI encoder 46 carry out basically the same pieces of processing as the EMI analyzing circuit 22 and the EMI-CPI encoder 23 respectively employed in the non-cognizant recorder 2.

A CCI analyzing circuit 42 analyzes CCI included in a transport packet of a transport stream supplied thereto, outputting a result of the analysis to a CCI encoder 43. When a transport stream played back by the digital-signal playback apparatus 3 is supplied to the cognizant recorder 4, by using an IEEE1394 digital interface, the cognizant recorder 4 determines whether the transport stream has been recorded in the storage media unit 31 employed in the digital-signal playback apparatus 3 by a cognizant or a non-cognizant recorder before recording the transport stream into the storage media unit 49 employed in the cognizant recorder 4. If the transport stream has been recorded in the storage media unit 31 by a cognizant recorder 4 as is the case with the storage media 49 employed in the cognizant recorder 4, a switch 51 is set on an A side. It should be noted that, in the case of a transport stream received from the IRD 1, the switch 51 is also set on the A side as well. The CCI encoder 43 converts the CCI supplied thereto into new CCI, supplying the new CCI to a CCI rewriting circuit 44. The CCI analyzing circuit 42 and the CCI encoder 43 carry out basically the same pieces of processing as the CCI analyzing circuit 95 and the CCI encoder 96 respectively employed in the conventional digital-signal recording apparatus 72 shown in FIG. 12.

If the transport stream has been recorded in the storage media unit 31 by a non-cognizant recorder 2 as is the case with the storage media 26 employed in the non-cognizant recorder 2, on the other hand, the switch 51 is set on a B side. In this case, CCI included in the transport stream is invalid. For this reason, the value of an EMI received from the EMI analyzing circuit 45 is supplied to an EMI-CCI encoder 50. The EMI-CCI encoder 50 outputs CCI for the EMI received from the EMI analyzing circuit 45.

The CCI rewriting circuit 44 rewrites CCI included in the transport packet received from the depacketizing circuit 41 with the CCI received from the CCI encoder 43 or the EMI-CCI encoder 50, outputting the transport packet to the recording-format encoder 47 which also receives CCI_invalid_flag having a value of 0 from a flag generating circuit 48. CCI_invalid_flag output by the flag generating circuit 25 employed in the non-cognizant recorder 2 has a value of 1 as described above to indicate that CCI included in a transport packet is invalid. On the other hand, CCI_invalid_flag output by the flag generating circuit 48 has a value of 0 to indicate that CCI included in a transport packet is valid.

The recording-format encoder 47 encodes a transport packet supplied thereto by the CCI rewriting circuit 44 into a format for storage media, that is, a format of VDR_MPEG2_transport_stream shown in FIGS. 5A and 5B. The encoded data is supplied to the storage media unit 49 to be stored therein.

Next, the operation of the information recording and playback system is exemplified by a case of recording data output by the IRD 1 or the digital-signal playback apparatus 3 in the non-cognizant recorder 2 or the cognizant recorder 4.

In an operation to record an output of the IRD 1, the receiving circuit 11 receives a broadcast wave of a predetermined channel, supplying a transport stream to the CCI analyzing circuit 12. As described above, the transport stream conforms to the MPEG2 systems (ISO/IEC13818-1). The CCI analyzing circuit 12 extracts copy control information (CCI) from the transport stream supplied thereto and supplies the CCI to the CCI-EMI encoder 13. A location in the transport stream at which CCI is recorded varies from application to application. Typically, CCI is stored in copyright_extension of a video layer or PES_scrambling_control of PES_packet. The CCI can be "copy prohibited", "copy once" or "copy free".

The CCI-EMI encoder 13 determines an EMI (Encryption_Mode Indicator) based on the CCI received from the CCI analyzing circuit 12. As described above, the EMI represents a mode in which data included in a pay load (data_field) of the isochronous packet has been encoded. The EMI can be one of the 3 modes, namely, mode A, mode B and free. The EMI indicates mode A for CCI of "copy prohibited" data and mode B for CCI "copy once" data. The EMI indicates the free mode for CCI of "copy free" (uncoded).

The CCI analyzing circuit 12 outputs transport packets of the transport stream received from the receiving circuit 11 to the packetizing circuit 14. The packetizing circuit 14 converts the transport packets received from the CCI analyzing circuit 12 into isochronous packets conforming to an MPEG TS protocol. To put it in detail, a source packet header of 4 bytes is added to a 188-byte transport packet of a transport stream output by the CCI analyzing circuit 12 to form a source packet of 192 bytes as shown in FIG. 4. A source packet is divided into 8 data blocks each comprising 24 bytes. Data composed of N data blocks is recorded in data_field of an isochronous packet. This data is encoded in accordance with the EMI. To be more specific, with the EMI indicating mode A, the data is encoded in mode A. With the EMI indicating mode B, the data is encoded in mode B. With the EMI indicating the free mode, the data is not encoded. As shown in FIG. 3, this EMI is added to the 1394 header.

The isochronous packets generated by the packetizing circuit 14 are output to the IEEE1394 serial bus 5.

In an operation to record a signal played back by the digital-signal playback apparatus 3, data recorded on a storage media unit 31 employed in the digital-signal playback apparatus 3 is played back and decoded by the recording-format decoder 32. The recording-format decoder 32 outputs transport packets obtained as a result of decoding and extracts CPI added to the external of the transport packets, outputting the CPI to the CPI-EMI encoder 33. The CPI-EMI encoder 33 generates an EMI based on a CPI supplied thereto, outputting the EMI to the packetizing circuit 34. As shown in FIG. 2, a CPI value of 11 represents "copy prohibited" and a CPI value of 10 represents "copy once". A CPI value of 00 represents "copy free". That is to say, the CPI-EMI encoder 33 generates an EMI to indicate mode A for CPI of "copy prohibited" data, mode B for CPI "copy once" data and the free mode for CPI of "copy free".

The packetizing circuit 34 converts the transport packets received from the recording-format decoder 32 into isochronous packets conforming to an MPEG TS protocol. That is to say, the packetizing circuit 34 carries out essentially the same processing as the packetizing circuit 14 employed in the IRD 1. The isochronous packets generated by the packetizing circuit 34 are output to the IEEE1394 serial bus 5.

Isochronous packets output by the IRD1 and the digital-signal playback apparatus 3 are transferred through the IEEE1394 serial buses 5 by using slots having a period of 125 μs and with different timing.

A recording operation in the non-cognizant recorder 2 is carried out as follows. The depacketizing circuit 21 depacketizes isochronous packets received from the IEEE1394 serial bus 5 and extracts an EMI included in the 1394 header, supplying the EMI to the EMI analyzing circuit 22. In addition, the depacketizing circuit 21 extracts a transport packet of the transport stream recorded in data_field of the isochronous packet, decodes the transport packet by using the EMI extracted from the 1394 header as a base and supplies the decoded packet to the recording-format encoder 24.

The EMI analyzing circuit 22 analyzes the EMI supplied thereto, supplying a result of the analysis to the EMI-CPI encoder 23. A transport packet is split into a plurality of isochronous packets which may have different EMIs. If the EMI varies from packet to packet as such, the EMI analyzing circuit 22 selects an EMI representing the strongest copy restriction mode among the EMIs of the isochronous packets as a representative value. The selected EMI is supplied to the EMI-CPI encoder 23. Assume that, a transport packet is split into 2 isochronous packets with an EMI indicating mode A (copy prohibited) and "copy free". In this case, the representative value of the EMIs is mode A (copy prohibited).

The EMI-CPI encoder 23 generates a CPI for the EMI supplied thereto by the EMI analyzing circuit 22, outputting the CPI to the recording-format encoder 24. If the EMI is "copy once", "copy prohibited" CPI is generated. If the EMI is "copy free", on the other hand, "copy free" CPI is generated.

It should be noted that, in the case of a "copy prohibited" EMI, the EMI-CPI encoder 23 controls the recording-format encoder 24 to prohibit a recording operation.

The flag generating circuit 25 generates a value of 1 as CCI_invalid_flag output to the recording-format encoder 24. This value of 1 indicates that the non-cognizant recorder 2 is not capable of decoding the CCI in a transport packet (or does not include a CCI analyzing circuit). A flag is thus recorded into the storage media unit 26 to indicate that the CCI in a transport packet to be recorded into the storage media unit 26 is not valid (or has an invalid value).

The recording-format encoder 24 encodes a transport packet supplied thereto by the depacketizing circuit 21 into data having a format for storage media. The data is supplied to the storage media unit 26 to be stored therein as VDR_MPEG2_transport_stream ( ) having a structure shown in FIGS. 5A and 5B. As shown in FIGS. 5A and 5B, VDR_MPEG2_transport_stream ( ) output by the recording-format encoder 24 includes TSP_extra_information ( ). As shown in FIG. 6, TSP_extra_information ( ) includes a CPI (copy_permission indicator) and CCI_invalid_flag.

In the cognizant recorder 4, on the other hand, the depacketizing circuit 41 receives isochronous packets supplied thereto through the IEEE1394 serial bus 5, extracting an EMI included in the 1394 header to be supplied to an EMI analyzing circuit 45. In addition, the depacketizing circuit 41 separates a transport packet of a transport stream included in the data_field of the isochronous packet, decoding the transport packet by using the EMI as a base. A result of decoding is supplied to a CCI analyzing circuit 42 and a CCI rewriting circuit 44.

The CCI analyzing circuit 42 has the same function as the CCI analyzing circuit 12 employed in the IRD 1. The CCI analyzing circuit 42 analyzes CCI included in the transport packet supplied thereto, outputting a result of the analysis to the CCI encoder 43. The location of the CCI in the transport packet is defined by the application. If necessary, the CCI encoder 43 updates the CCI received from the CCI analyzing circuit 42. To be more specific, if the received CCI is "copy once", new "copy prohibited" CCI is generated. By the same token, if the received CCI is "copy free", new "copy prohibited" CCI is also generated as well. The CCI encoder 43 supplies the new CCI to the CCI rewriting circuit 44. It should be noted that, if the CCI received from the CCI analyzing circuit 42 is "copy prohibited", the CCI encoder 43 controls the CCI rewriting circuit 44 to prohibit a recording operation.

The CCI rewriting circuit 44 rewrites CCI included in a transport packet received from the depacketizing circuit 41 with the new CCI received from the CCI encoder 43, outputting the transport packet to the recording-format encoder 47.

The EMI analyzing circuit 45, the EMI-CPI encoder 46 and the recording-format encoder 47 carry out basically the same pieces of processing as the EMI analyzing circuit 22, the EMI-CPI encoder 23 and the recording-format encoder 24 respectively employed in the non-cognizant recorder 2. That is to say, a CPI supplied by the EMI-CPI encoder 46 and CCI_invalid_flag supplied by the flag generating circuit 48 are added to a transport packet received from the depacketizing circuit 41 by way of the CCI rewriting circuit 44, generating VDR_MPEG2_transport_stream shown in FIGS. 5A and 5B to be recorded into the storage media unit 49. It should be noted that CCI_invalid_flag is set by the flag generating circuit 48 at 0 to indicate that the cognizant recorder 4 has the CCI analyzing circuit 42 or a function to analyze CCI included in a transport packet. As described above, the CCI has been rewritten to new CCI by the CCI encoder 43 and the CCI rewriting circuit 44. Thus, CCI included in a transport packet recorded into the storage media unit 49 is the new CCI. For this reason, CCI_invalid_flag is set at 0 in order to indicate that the CCI is valid.

Figure 7:
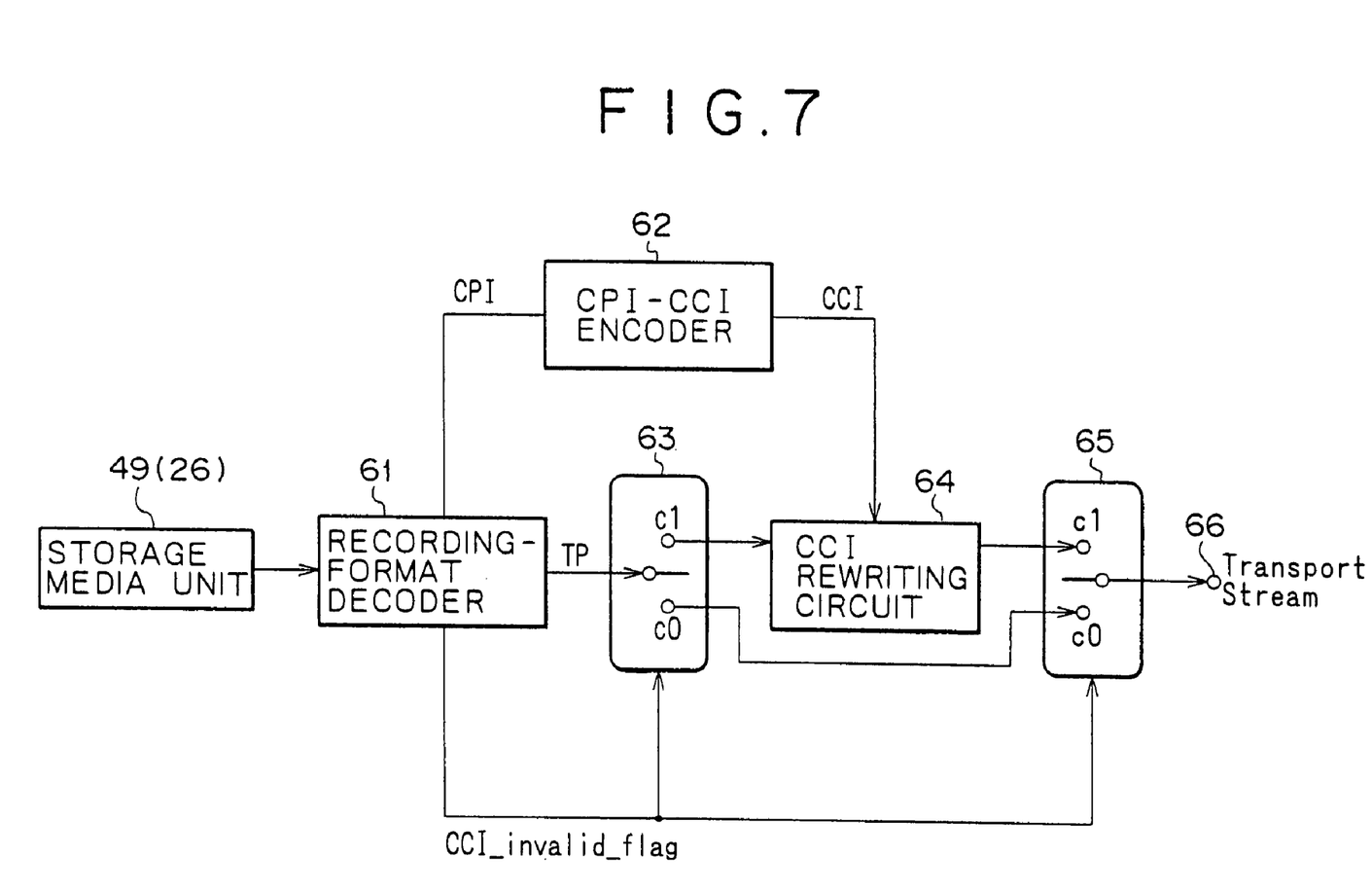
FIG. 7 is a block diagram showing a typical configuration of an information playback apparatus provided by the present invention.

A transport stream transmitted through the IEEE1394 serial bus 5 and recorded on the storage media unit 26 or the storage media unit 49 as described is played back by a playback apparatus like one shown in FIG. 7. In this playback apparatus, a signal played back from the storage media unit 26 or the storage media unit 49 is decoded by a recording-format decoder 61. Transport packets of a transport stream output by the recording-format decoder 61 are supplied to a CCI rewriting circuit 64 by way of a contact point c1 of a switch 63 or to a contact point c0 of a switch 65 by way of a contact point c0 of the switch 63. In addition, the recording-format decoder 61 separates a CPI and CCI_invalid_flag from the signal supplied thereto, outputting the CPI to a CPI-CCI encoder 62 and CCI_invalid_flag to the switches 63 and 65 as a switching control signal.

The CPI-CCI encoder 62 converts the CPI supplied thereto into CCI, outputting the CCI to the CCI rewriting circuit 64. The CCI rewriting circuit 64 rewrites the CCI of a transport packet supplied by the recording-format decoder 61 by way of the contact point c1 of the switch 63 with the CCI received from the CPI-CCI encoder 62. The switch 65 selects a signal supplied to either a contact point c1 or the contact point c0, outputting the signal to an output terminal 66.

Next, the operation of the playback apparatus shown in FIG. 7 is explained. As described above, data is recorded in the storage media unit 26 or 49 in a format of VDR_MPEG2_transport_stream shown in FIGS. 5A and 5B. The recording-format decoder 61 separates transport packets from a signal having this format, supplying the transport packets to the switch 63. In addition, the recording-format decoder 61 extracts a CPI and CCI_invalid_flag included in VDR_MPEG2_transport_stream ( ) supplied thereto, supplying the CPI to the CPI-CCI encoder 62 and CCI_invalid flag to the switches 63 and 65.

In the case of CCI_invalid_flag having a value of 0 to indicate that the CCI included in the transport packet received from the recording-format decoder 61 is valid, the switches 63 and 65 each select its contact point c0. That is to say, data recorded by the cognizant recorder 4 into the storage media unit 49 is being played back from the storage media unit 49. In this case, transport packets output by the recording-format decoder 61 are output to the output terminal 66 as they are by way of the contact point c0 of the switch 63 and the contact point c0 of the switch 65.

In the case of CCI_invalid_flag having a value of 1 to indicate that the CCI included in the transport packet received from the recording-format decoder 61 is invalid, on the other hand, the switches 63 and 65 each select its contact point c1. That is to say, when data recorded by the non-cognizant recorder 2 into the storage media unit 26 is being played back from the storage media unit 26, the switches 63 and 65 each select its contact point c1.

The CPI-CCI encoder 62 converts the CPI supplied thereto into CCI. To be more specific, a "copy once" CPI is converted into "copy once" CCI and a "copy prohibited" CPI is converted into "copy prohibited" CCI. By the same token, a "copy free" CPI is converted into "copy free" CCI.

The CCI rewriting circuit 64 rewrites the CCI of a transport packet supplied by the recording-format decoder 61 by way of the contact point c1 of the switch 63 with the CCI received from the CPI-CCI encoder 62, supplying the transport packet to the output terminal 66 by way of the contact point c1 of the switch 65.

In this way, also in an operation to play back data recorded by the non-cognizant recorder 2 into the storage media unit 26 from the storage media unit 26, the CCI is rewritten. Thus, an output transport stream is the same as a transport stream recorded by the cognizant recorder 4 into the storage media unit 49 and played back from the storage media unit 49. As a result, in a later attempt to carry out recording by using a cognizant recorder capable of analyzing CCI, correct copy control for the copy control information can be carried out.

As described above, CCI and CCI_invalid_flag are recorded in each transport packet. It should be noted, however, that CCI and CCI_invalid_flag can also be recorded in each other unit such as any plurality of transport packets, a program or a cut (a scene).

In addition, a CPI and CCI_invalid_flag can also be recorded in a stream separate from and independent of the transport stream. For example, when a program of a plurality of transport streams is recorded into storage media, a CPI and CCI_invalid_flag can be recorded in a data-base stream provided to represent data recorded in the storage media. In addition, in the case of media controlled by a file system, the transport stream can be recorded as an AV file while the CPI and CCI_invalid_flag can be recorded in a file which is provided for storing information on attributes of the media.

Figure 8:
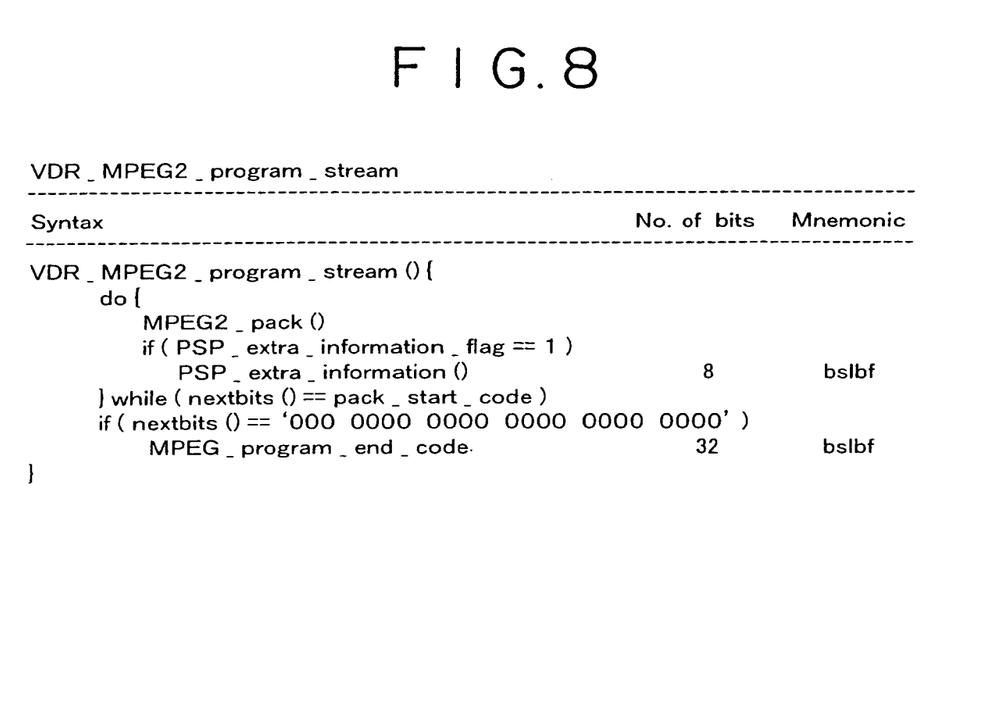
FIG. 8 is an explanatory diagram showing VDR_MPEG2_program_stream.
Figure 9:
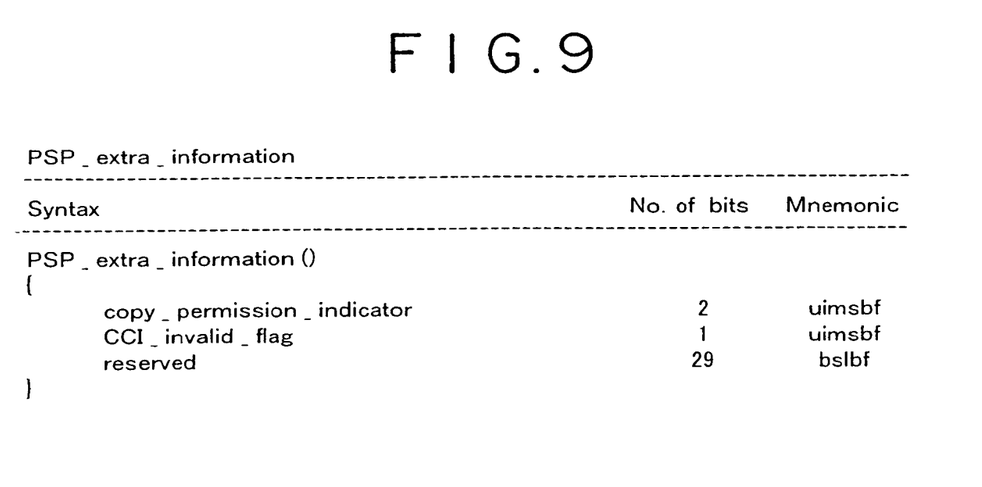
FIG. 9 is an explanatory diagram showing PSP_extra_information.

In addition, an operation to record a transport stream is taken as an example. It should be noted, however, that the present invention can also be applied to an operation to record a program stream. In this case, the program stream has the configuration of VDR_MPEG2_program_stream shown in FIG. 8. As shown in the figure, VDR_MPEG2_program_stream includes PSP_extra_information ( ) which includes a CPI and CCI_invalid_flag as shown in FIG. 9.

Figure 10:
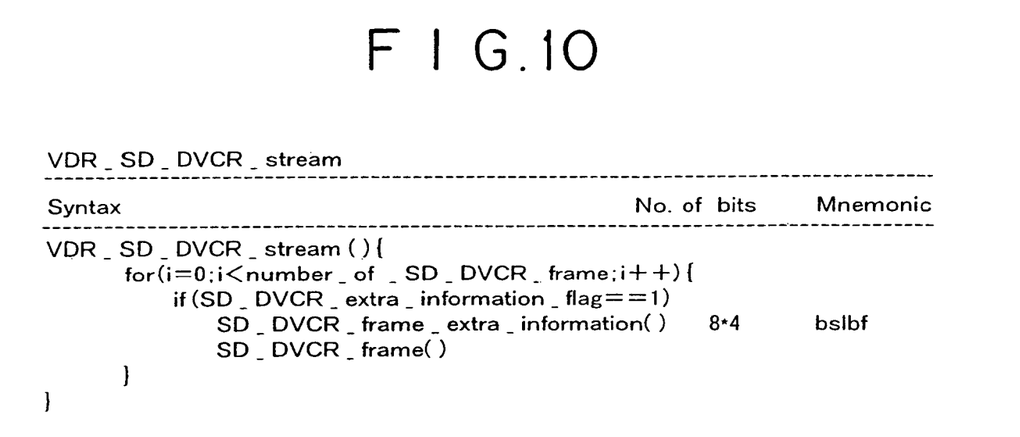
FIG. 10 is an explanatory diagram showing VDR_SD_DVCR_stream.
Figure 11:
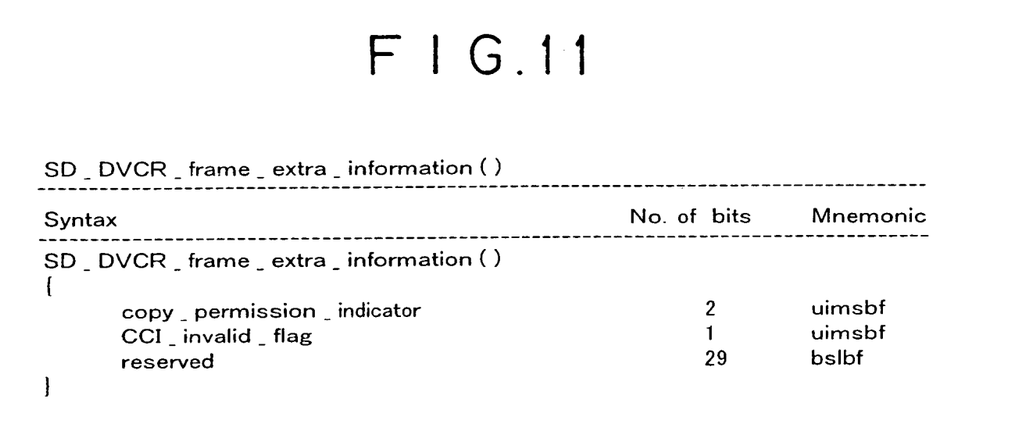
FIG. 11 is an explanatory diagram showing SD_DVCR_frame_extra_information.

Furthermore, the present invention can also be applied to an operation to record a DV stream. In this case, the DV stream has the configuration of VDR_ST_DVCR stream shown in FIG. 10. As shown in the figure, VDR_ST_DVCR_stream includes SD_DVCR_frame_extra_information ( ) which includes a CPI and CCI_invalid_flag as shown in FIG. 11.

It is worth noting that, in this specification, a system means the whole equipment comprising a plurality of apparatuses.

It should be noted that, as a presentation medium for presenting a computer program to be executed to carry out the processing described above to the user, a communication medium such as a network or a satellite can be used in addition to recording media such as a magnetic disc, a CD-ROM and a solid-state memory.

According to an information processing apparatus as in claim 1, an information processing method as in claim 8 and a presentation medium as in claim 9, second copy control information generated in accordance with extracted auxiliary information is added to main information. As a result, even an apparatus not capable of analyzing first copy control information is capable of executing copy control.

According to an information processing apparatus as in claim 10, an information processing method as in claim 13 and a presentation medium as in claim 14, first copy control information included in main information is rewritten in accordance with second copy control information extracted from input information. As a result, it is possible to generate information that can be used for executing copy control even without resorting to an apparatus for recording information.

What is claimed is:
1. An information processing apparatus, comprising:
an extractor configured to extract main information including copy control information, and to extract auxiliary information representing attributes of said main information, from input information;

a generator configured to generate copy permission information based on said extracted auxiliary information; and a recorder configured to record the main information including the copy control information as a 188-byte transport stream packet, and to record the copy permission information generated by the generator in an extra 4-byte header adjacent to, but separate from, the 188-byte transport stream packet.

2. The information processing apparatus according to claim 1, wherein said generator is further configured to generate a flag indicating validity of said copy permission information generated by the generator based upon whether said apparatus that recorded said main information recognized and processed said copy control information; and the recorder is configured to record the flag indicating validity of the copy permission information in the extra 4-byte header.

3. The information processing apparatus according to claim 1 wherein:

said main information is a transport stream; and said auxiliary information is information indicating a mode in which said main information is encoded.

4. The information processing apparatus according to claim 3, wherein said copy permission information is recorded by said recorder in an extra 4-byte header for each transport stream packet of said transport stream.

5. The information processing apparatus according to claim 1 wherein:

said input information is received through an IEEE1394 digital interface; and said auxiliary information is an Encryption Mode Indicator (EMI).

6. An information processing method for outputting information, said method comprising:

extracting main information including copy control information and extracting auxiliary information representing attributes of said main information from input information;

generating copy permission information based on said extracted auxiliary information; and recording the main information including the copy control information as a 188-byte transport stream packet, and recording the copy permission information generated in the generating step in an extra 4-byte header adjacent to, but separate from, the 188-byte transport stream packet.

7. The information processing apparatus of claim 1, further comprising:

a splitter configured to split the input information into a plurality of isochronous packets, each having an Encryption Mode Indicator (EMI) associated therewith; and an analyzing circuit configured to select a strongest copy restriction mode from among the EMIs associated with the plurality of isochronous packets at a value representative of the input information.

8. The information processing apparatus of claim 7, wherein the generator is configured to generate a Copy Permission Indicator (CPI) corresponding to the EMI having the strongest copy restriction mode.

9. The information processing method according to claim 6 further comprising:

generating a flag indicating validity of said copy permission information based upon whether said apparatus that recorded said main information recognized and processed said first copy control information; and recording the flag in the extra 4-byte header.

10. The information processing method according to claim 6 wherein:

said main information is a transport stream; and said auxiliary information is information indicating a mode in which said main information is encoded.

11. The information processing method according to claim 6, wherein said copy permission information is recorded in an extra 4-byte header for each transport stream packet of said transport stream.

12. The information processing method according to claim 6 wherein:

said input information is received through an IEEE1394 digital interface; and said auxiliary information is an Encryption Mode Indicator (EMI).

13. The information processing method of claim 6, further comprising the steps of:

splitting the input information into a plurality of isochronous packets, each having an Encryption Mode Indicator (EMI) associated therewith; and selecting a strongest copy restriction mode from among the EMIs associated with the plurality of isochronous packets at a value representative of the input information.

14. The information processing method of claim 13, wherein the generating step comprises generating a Copy Permission Indicator (CPI) corresponding to the EMI having the strongest copy restriction mode.

15. An information processing apparatus, comprising:

an extractor configured to extract main information including copy control information and to extract auxiliary information representing attributes of said main information from input information;

an analyzing circuit configured to analyze said copy control information;

an encoder configured to convert said copy control information into new copy control information when it is determined that said copy control information is valid;

a generator configured to generate copy permission information based on said extracted auxiliary information; and a recorder configured to record the main information and said new copy control information as a 188-byte transport stream packet, and to record the copy permission information generated by the generator in an extra 4-byte header adjacent to, but separate from, the 188-byte transport stream packet.

16. The information processing apparatus according to claim 15, wherein said generator is further configured to generate said new copy control information when it is determined that said copy control information is invalid.

17. The information processing apparatus according to claim 16, wherein the generator is configured to generate a flag indicating whether said copy control information is valid based upon whether an apparatus that recorded said main information recognized and processed said first copy control information; and the recorder is configured to record the flag in the extra 4-byte header.

18. The information processing apparatus according to claim 15 wherein:

said main information is a transport stream; and said auxiliary information is information indicating a mode in which said main information is encoded.

19. The information processing apparatus according to claim 18, wherein said copy permission information is recorded by said recorder in an extra 4-byte header for each transport packet of said transport stream.

20. The information processing apparatus according to claim 15 wherein:
   said input information is received through an IEEE1394 digital interface; and
   said auxiliary information is an Encryption Mode Indicator (EMI).

21. An information processing method for outputting information, said method comprising:
   extracting main information including copy control information and extracting auxiliary information representing attributes of said main information from input information;
   analyzing said copy control information;
   converting said copy control information into new copy control information when it is determined that said copy control information is valid;
   generating copy permission information based on said extracted auxiliary information; and
   recording the main information and said new copy control information as a 188-byte transport stream packet, and recording the copy permission information generated in the generating step in an extra 4-byte header adjacent to, but separate from, the 188-byte transport stream packet.

22. The information processing method of claim 21, further comprising:
   splitting the input information into a plurality of isochronous packets, each having an Encryption Mode Indicator (EMI) associated therewith; and
   selecting a strongest copy restriction mode from among the EMIs associated with the plurality of isochronous packets at a value representative of the input information.

23. The information processing method of claim 22, wherein the generating step comprises generating a Copy Permission Indicator (CPI) corresponding to the EMI having the strongest copy restriction mode.

24. The information processing method according to claim 22, further comprising:
   generating a flag indicating validity of said copy permission information based upon whether an apparatus that recorded said main information recognized and processed said first copy control information; and
   recording the flag in the extra 4-byte header.

25. The information processing method according to claim 22, wherein:
   said main information is a transport stream; and
   said auxiliary information is information indicating a mode in which said main information is encoded.

26. The information processing method according to claim 22, wherein said copy permission information is recorded in an extra 4-byte header for each transport stream packet of said transport stream.

27. The information processing method according to claim 22, wherein:
   said input information is received through an IEEE1394 digital interface; and
   said auxiliary information is an Encryption Mode Indicator (EMI).

28. The information processing method of claim 22, further comprising the steps of:
   splitting the input information into a plurality of isochronous packets, each having an Encryption Mode Indicator (EMI) associated therewith; and
   selecting a strongest copy restriction mode from among the EMIs associated with the plurality of isochronous packets at a value representative of the input information.

29. The information processing method of claim 28, wherein the generating step comprises generating a Copy Permission Indicator (CPI) corresponding to the EMI having the strongest copy restriction mode.

30. An information processing apparatus, comprising:
   an extractor configured to extract main information including copy control information and to extract auxiliary information representing attributes of said main information from input information;
   a first generator configured to generate copy permission information and a second generator configured to generate copy control information based on said extracted auxiliary information; and
   a recorder configured to record the main information and said copy control information as a 188-byte transport stream packet, and to record the copy permission information generated by the first generator in an extra 4-byte header adjacent to, but separate from, the 188-byte transport stream packet.

31. The information processing apparatus according to claim 30, wherein said second generator is further configured to generate said copy control information when it is determined that said copy control information is invalid.

32. The information processing apparatus according to claim 31, wherein the generator is configured to generate a flag indicating whether said copy control information is valid based upon whether an apparatus that recorded said main information recognized and processed said first copy control information and
   the recorder is configured to record the flag in the extra 4-byte header.

33. The information processing apparatus according to claim 30, wherein:
   said main information is a transport stream; and
   said auxiliary information is information indicating a mode in which said main information is encoded.

34. The information processing apparatus according to claim 33, wherein said copy permission information and said copy control information are recorded by said recorder in an extra 4-byte header for each transport stream packet of said transport stream.

35. The information processing apparatus according to claim 30, wherein:
   said input information is received through an IEEE1394 digital interface; and said auxiliary information is an Encryption Mode Indicator (EMI).

36. An information processing method for outputting information, said method comprising:
   extracting main information including copy control information and extracting auxiliary information representing attributes of said main information from input information;
   generating copy permission information and copy control information based on said extracted auxiliary information; and
   recording the main information and said copy control information as a 188-byte transport stream packet, and recording the copy permission information generated in the generating step in an extra 4-byte header adjacent to, but separate from, the 188-byte transport stream packet.

37. The information processing method of claim 36, further comprising the steps of:
- splitting the input information into a plurality of isochronous packets, each having an Encryption Mode Indicator (EMI) associated therewith; and
- selecting a strongest copy restriction mode from among the EMIs associated with the plurality of isochronous packets at a value representative of the input information.

38. The information processing apparatus of claim 36, wherein the generating step comprises generating a Copy Permission Indicator (CPI) corresponding to the EMI having the strongest copy restriction mode.

39. The information processing method according to claim 36, further comprising generating a flag indicating validity of said copy permission information based upon whether an apparatus that recorded said main information recognized and processed said first copy control information; and
- recording the flag in the extra 4-byte header.

40. The information processing method according to claim 36, wherein:
- said main information is a transport stream; and
- said auxiliary information is information indicating a mode in which said main information is encoded.

41. The information processing method according to claim 36, wherein said copy permission information and said copy control information is recorded in an extra 4-byte header for each transport stream packet of said transport stream.

42. The information processing method according to claim 36, wherein:
- said input information is received through an IEEE1394 digital interface; and
- said auxiliary information is an Encryption Mode Indicator (EMI).

43. The information processing method of claim 36, further comprising the steps of:
- splitting the input information into a plurality of isochronous packets, each having an Encryption Mode Indicator (EMI) associated therewith; and
- selecting a strongest copy restriction mode from among the EMIs associated with the plurality of isochronous packets at a value representative of the input information.

44. The information processing method of claim 43, wherein the generating step comprises generating a Copy Permission Indicator (CPI) and copy control information corresponding to the EMI having the strongest copy restriction mode.

* * * * *